United States Patent [19]
Dye

[11] Patent Number: 5,664,162
[45] Date of Patent: Sep. 2, 1997

[54] GRAPHICS ACCELERATOR WITH DUAL MEMORY CONTROLLERS

[75] Inventor: Thomas Anthony Dye, Austin, Tex.

[73] Assignee: Cirrus Logic, Inc., Fremont, Calif.

[21] Appl. No.: 333,628

[22] Filed: Nov. 3, 1994

Related U.S. Application Data

[63] Continuation-in-part of Ser. No. 247,657, May 23, 1994.

[51] Int. Cl.$^6$ .............................. G06F 13/16; G06F 15/16; G06F 12/06
[52] U.S. Cl. ..................... 345/521; 345/503; 345/516; 345/520; 345/526; 345/200
[58] Field of Search ........................................ 395/162–166, 395/309, 310, 401–406, 481, 520, 521, 800; 345/133, 186, 189, 200, 203; 364/926.92; 365/189.01, 223, 230.01, 230.03, 230.05, 230.09

[56] References Cited

U.S. PATENT DOCUMENTS

| | | | |
|---|---|---|---|
| 5,522,027 | 5/1996 | Matsumoto et al. | 395/163 |
| 5,522,082 | 5/1996 | Guttag et al. | 395/800 |
| 5,560,030 | 9/1996 | Guttag et al. | 395/800 |

*Primary Examiner*—Mark R. Powell
*Assistant Examiner*—U. Chauhan
*Attorney, Agent, or Firm*—Stanford & Bennett

[57] ABSTRACT

A processor having two separate and relatively independent memory controllers to achieve a dual interface architecture. A first memory controller is coupled to the host interface for retrieving data and instructions and a second memory controller is coupled to an independent local bus for interfacing with a frame buffer memory. A depth buffer may also be coupled to the local bus if desired. Address multiplexor logic is preferably included to allow either memory controller to address either external bus. Multiplexor and buffer logic is also preferably included to allow data transfer in either direction. Preferably, the processor is a graphics processor and both memory controllers are programmable for different addressing formats, such as linear and X/Y in the preferred embodiment. In this manner, data is transferred from host to local memories, and vice versa, in any desired format without delays due to memory controller reconfiguration. Data transfers from one location to another within a single memory, such as window moves within the frame buffer, are achieved much faster. Dual memory controllers allow command or instruction prefetching during execution of a previous command. More sophisticated graphics functions, such as texture mapping and data alignment, are also performed much faster and more efficiently.

51 Claims, 8 Drawing Sheets

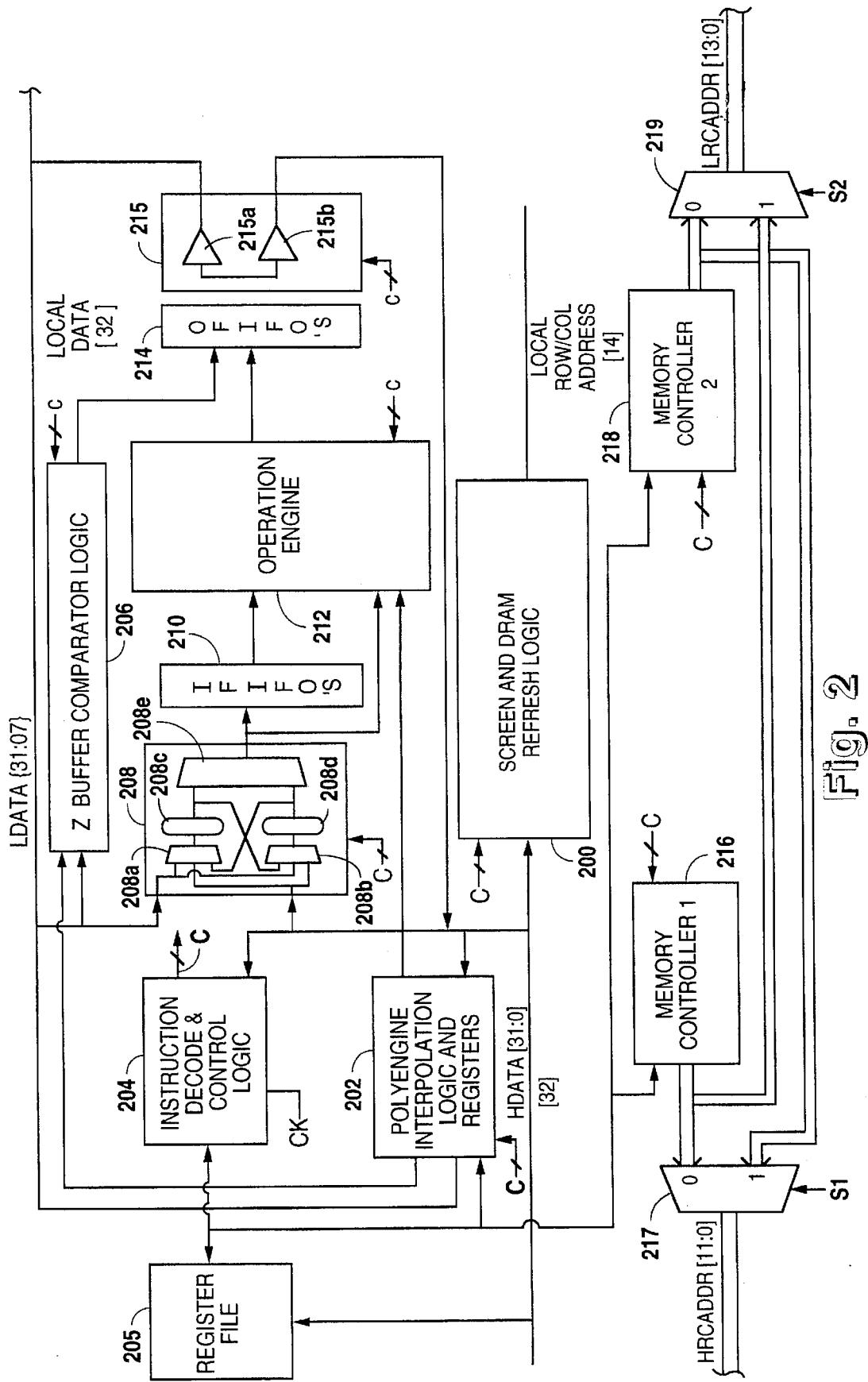

GRAPHICS ACCELERATOR WITH DUAL MEMORY CONTROLLERS

CROSS-REFERENCE TO RELATED APPLICATION(S)

This is a continuation-in-part of co-pending application Ser. No. 08/247,657 filed on May 23, 1994, entitled "Dynamic Pipeline for a Processor."

1. Field of the Invention

The present invention relates to graphics processors, and more particularly to a graphics processor having dual memory controllers.

2. Description of the Related Art

The advent of substantial hardware improvements combined with standardized graphics languages has allowed the use of complex graphics functions in even the most common applications. For example, word processors, spreadsheets, and desktop publishing packages are now beginning to take full advantage of the improvements in graphics capabilities to improve the user interface. Although sophisticated graphics packages have been available for computer aided drafting, design and simulation for years, three dimensional graphic displays are now common in games, animation and multimedia communication designed for personal computers.

The architecture of the personal computer system has advanced to handle the sophisticated graphic capabilities required by modem software applications. In less sophisticated designs, a single CPU handled all data functions including graphics functions. In more complicated architectures, a separate graphics processor is provided to perform all graphic functions in order to relieve the primary CPU to perform other operations. A graphics processor generally transfers data and draws points, lines, polylines, text, string text, triangles, and polygons within a frame buffer for display. The graphics processor is connected between a computer system bus and the video or frame buffer. The frame buffer is the memory which stores the video data that is actually displayed on the video screen. A video controller is connected to the frame buffer to convert the digital rasterized data from the frame buffer to the analog signals needed by the display device.

An example of a graphics processor is the TMS34010 by Texas Instruments, Inc. When it was developed, the TMS34010 combined the functions of a graphics controller and a general purpose processor to provide more flexibility. The TMS34010 includes a host graphics interface to connect to the host bus of a computer system, as well as a local memory bus for connection to both conventional dynamic random access memories (DRAMs) for program and data storage, as well as video RAM (VRAM) to implement a frame buffer for coupling to a CRT monitor through a RAMDAC (RAM digital to analog converter) or similar device. The separate interfaces allow the host processor and host bus to be separated from the graphics bus Which decouples the host system from the bandwidth requirements of frame buffer updates and screen refreshes. The host CPU can access the local bus indirectly through a register.

Prior processors such as the TMS34010 support several fundamental graphics functions and operations, such as pixel block transfers (PIXBLT) and fill instructions to manipulate two-dimensional arrays of pixels, line instructions for drawing various lines and polygons, draw in advance instructions for drawings circles, ellipses, arcs and other curves, and pixel transfer instructions for transferring individual pixels from one location to another. The TMS34010 supports X, Y addressing for defining an array of pixels on a screen, such as that which would be displayed as a window on a CRT, as well as linear addressing for storing graphics data in memory off screen, such as in conventional DRAMs. The TMS34010 allowed PIXBLT transfers from one location to another within memory, as well as X, Y to linear address conversion, and linear to X, Y address conversion during the pixel block move. Furthermore, Boolean and arithmetic pixel processing, plane masking, and transparency functions could be performed during the transfer.

The TMS34010 thus has several desirable capabilities to improve the graphics performance of a personal computer system. However, it is evident that the demand for greater graphics capabilities have increased dramatically, so that graphics processor must be capable of performing more sophisticated functions in less time. Computer-aided design applications (CAD), as well as three-dimensional (3D) graphics operations, sophisticated shading algorithms, transparency and alpha-blending, live video windows, and stereo 3D windows are now desired on most desktop computer systems. The graphics processor must be able to draw complicated geographical figures and fill them while performing complicated 2D and 3D functions, such as patterning, depth cueing, color compare, alpha blending, accumulation, texture assisting, anti-aliasing, supersampling, color masking, stenciling, panning and zooming, as well as depth and color interpolation, among other functions. The graphics processor must also draw the geographical figures at a much greater speed while manipulating the pixel data being drawn. Furthermore, the graphics processor must handle complex pixel data transfers from one location in memory to another. For example, it is desired that the graphics processor move data stored in linear addressing format from an offscreen memory area to X, Y addressing format on the screen of the computer while also performing complicated alpha-blending, interpolation, or even texture mapping while being drawn on the screen of the computer.

Prior art graphics processors, including the TMS34010, are simply unable to provide all of these capabilities at the required speed of present day computer systems. Although prior art graphics processors often include two or more bus interfaces, the graphics processor was only able to operate on one bus at a time. Such prior art graphics processors had to be programmed to read data from a source location at one pitch, and then had to be reprogrammed to write the data to a destination at a new pitch. As a result, the single interface unit had to handle all functions on two separate buses. For example, the memory controller was configured to read data in linear addressing format from the host memory, and then had to be reconfigured to write the data in X, Y format in the frame buffer. This procedure was very tedious and slow.

Prior art graphics processors execute many other desirable functions relatively slowly. When moving a window from one location to another in the frame buffer, the single memory controller had to be reconfigured at least once and more likely many times for each line of data. The memory controller read one line of data and then had to be reprogrammed to write the data to another location before writing the line to the new location. Then, the memory controller had to be reprogrammed once again to retrieve the next line of source data and so on. Such an operation requires extensive FIFO operations, or requires a reconfiguration of the memory controller between each source read and the destination write. When executing graphics instructions, the instruction and its corresponding parameters had to be read first by the memory controller, and then the memory controller had to be reconfigured to write the graphics data to the frame buffer for display. Only after all the data was written could the memory controller retrieve the next instruction.

More complicated functions are performed relatively slowly by present processors. In texture mapping, data is read in a u, v format in a non-linear random fashion, then written in X, Y format, requiring intermediate reprogramming of the memory controller. Complex bit-block or "blit" operations require data to be read from two different memory sources and then written back into one of the memory locations. The entire operation experiences stall periods while the memory controller reads data from one source and then the other, and is then reconfigured before writing the output data. Data alignment of non-aligned data is slow since it requires reading two data bytes or words before a single byte or word can be written in aligned format.

It is therefore desirable to provide a graphics processor to perform high level graphics functions and to achieve faster graphic data transfer without significantly depreciating the performance of the computer system. It is thus desirable to provide the functionality of high end work stations to the desktop environment without substantially increasing cost of the computer system.

SUMMARY OF THE INVENTION

A processor according to the present invention includes two relatively independent memory controllers coupled to two separate interfaces and corresponding memories. In the preferred embodiment, a first memory controller addresses data in memory connected to a host bus and a second memory controller addresses data in memory connected to a local bus. Preferably, both memory controllers are coupled to both host and local buses through multiplexor logic for complete flexibility. Also, multiplexor and buffer logic is coupled to the data path to allow data flow in either direction. In this manner, data is read from either memory location in one format and written to another location in either memory in the same or a different format much faster than can be done with a single memory controller. Furthermore, the data is either transferred without change or can be operated on or otherwise modified during transfer since the data always passes through an operation engine. This facilitates complex block transfers or complex "blits" where data from two different source locations are combined in the operation engine.

A graphics processor according to the present invention preferably includes a private memory comprising DRAMs coupled to the host bus. The private memory preferably stores display lists, texture maps, bitmapped fonts, and offscreen data, but can also serve as a virtual frame buffer. Also in the preferred embodiment, a frame buffer comprising VRAMs and an optional Z buffer comprising DRAMs for achieving 3D capabilities are both coupled to the local bus. The first memory controller typically fetches commands, pixel data, and/or texture and font values from the private memory in linear format for processing by the graphics processor. The second memory controller typically writes the data to the frame buffer in X, Y format or performs BITBLT (bit-block) operations for moving data arrays from one location to another within the frame buffer.

A processor with a dual interface architecture according to the present invention allows substantial improvement in performance of the graphics system. Address translation is performed without having to reprogram either memory controller by programming one memory controller in the source format and the second memory controller in the destination format. Thus, data stored in linear format in the private memory is linearly addressed by the first memory controller and the second memory controller writes the data to the frame buffer in X, Y addressing format. Likewise, data stored in X, Y format within the frame buffer is accessed by the second memory controller and the first memory controller writes the data to the private memory in linear addressing format. Furthermore, a processor having dual memory controllers according to the present invention allows command pipelining or prefetching of a second instruction while executing a first. In this manner, subsequent instructions for drawings lines, polylines, polygons, etc. are prefetched from the host or private memory, while a previous instruction is being executed by the graphics processor and corresponding data written by the second memory controller. Address translation and command pipelining can be performed simultaneously. Instructions and corresponding parameters are retrieved in one format, while the output data is written into a different memory location in a different addressing format.

A dual memory architecture according to the present invention performs sophisticated graphics functions in less time than that required for graphics processors having only one memory controller. When moving windows in the frame buffer, one memory controller is configured to read data from the source window while the other memory controller is configured to write the data to the destination window. This use of two memory controllers eliminates the need for a large internal memory area or the requirement to reconfigure a memory controller multiple times during the transfer. In a similar manner, data read from u, v space by one controller in a non-linear random manner is written by the other in normal X, Y mode during texture mapping operations without intermediate reconfigurations. Complex blit operations are performed much faster since all source data is read at once and then written out. Data re-alignment operation is also faster where one memory controller continually reads two data elements or bytes while the other controller continually writes one byte at a shifted location thereby properly aligning the data.

Thus, it can be appreciated that a processor having a dual interface architecture according to the present invention allows superior performance through the use of two separate and relatively independent memory controllers. This is particularly advantageous to achieve greater graphics capabilities in personal computer systems without substantially increasing costs.

BRIEF DESCRIPTION OF THE DRAWINGS

A better understanding of the present invention can be obtained when the following detailed description of the preferred embodiment is considered in conjunction with the following drawings, in which:

FIG. 2 is a simplified block diagram of the graphics processor of FIG. 1;

DETAILED DESCRIPTION OF THE PREFERRED EMBODIMENT

Figure 1:
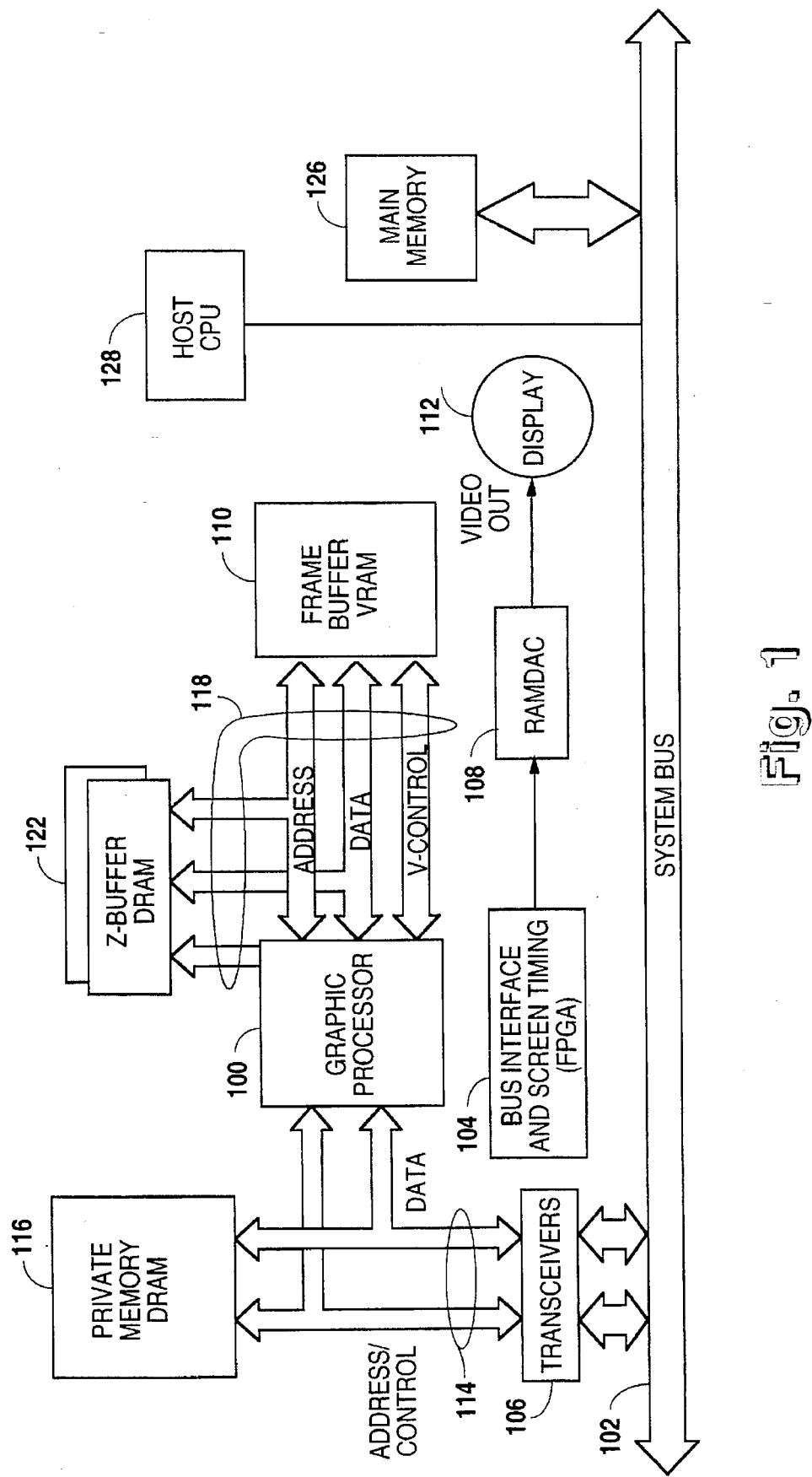
FIG. 1 is a simplified block diagram of a graphics system connected to a system bus of a computer system, where the graphics system includes a graphics processor implemented according to the present invention.

Referring now to FIG. 1, a simplified block diagram is shown of a graphics system coupled to a system bus 102 of a host computer system, where the graphics system includes a graphics processor 100 implemented according to the present invention. The system bus 102 is any one of a plurality of different types of host or input/output (I/O) buses, including the industry standard architecture (ISA), the extended ISA (EISA), the peripheral component interconnect (PCI), the video electronic standard association (VESA) local bus or the L-bus, or any other standardized system bus of a computer system. The graphics processor 100 is preferably a 32-bit graphics processor operating at a frequency of 33 Megahertz (MHz) and is coupled to the system bus 102 through bus interface and screen timing logic (FPGA) 104. Of course, lower or higher operation frequencies are achievable and contemplated. The FPGA 104 is used to control a set of transceivers 106 and a random-access memory digital-to-analog converter (RAMDAC) 108, where it interfaces to the system bus 102, controls the decoding of cycles to the RAMDAC 108 and determines video timing.

The RAMDAC 108 receives digital data stored in a frame buffer 110 and converts the digital data to the appropriate analog outputs required by a display unit 112. In the preferred embodiment, the frame buffer 110 is part of a raster display implemented in a video RAM (VRAM), where the digital data comprises a rectangular array of picture elements referred to as pixels or pixel values. Each pixel value is preferably 8 bits for defining the intensity of a single color of a corresponding pixel on a screen of the display unit 112. However, either three passes are made or three parallel logic slices are implemented for the three primary colors to achieve 24 bit pixel values for full color display. The frame buffer 110 stores pixel values for a 4096×4096 screen size or 16 Megabytes (MB) of memory. The display unit 112 may be any type, such as a cathode ray tube (CRT) for desktop, workstation or server applications, or a liquid crystal display (LCD) or the like commonly used for portable computers.

The transceivers 106 are used to interface the graphics processor 100 with the system bus 102 through address, data and control signals, collectively referred to as the HBUS 114, which is further connected to an optional private memory 116. The address portion or host address bus is preferably 12 bits, although these signals are asserted as row and column signals for addressing 8MB worth of memory. The host data bus is 32 bits in length for transferring 4 bytes at a time, equivalent to one 32-bit instruction or 4 pixels. In the preferred embodiment, the private memory 116 acts as a virtual frame buffer, display list storage, texture map, and bit mapped fonts storage memory to improve performance and functionality of the graphics system. The private memory 116 is preferably added as a separate bank of external dynamic RAMs (DRAMs) for providing a performance improvement by permitting faster access to display list instructions and pixel data compared to data stored in main memory 126 of the host computer system. The private memory 116 is preferably up to 8MB for achieving a 2048×2048 byte pseudo-display, or for storing up to 8MB worth of instructions and data.

The graphics processor 100 communicates to the frame buffer 110 through address, data and control lines, collectively referred to as the LBUS 118, which is further connected to a Z-buffer 122, also preferably implemented using DRAMs. The local address bus is preferably 14 bits for addressing the pixels of the frame buffer 110. The local data bus is preferably 32 bits in length for transferring one word or 4 pixels at a time. Throughout this disclosure, a word is equal to 4 bytes or 32 bits. The Z-buffer 122 is preferably used to implement a depth buffer for three-dimensional (3D) graphic displays, where each depth value is preferably 16 bits. Separate control signals of the LBUS 118 are also connected between the graphics processor 100 and the Z-buffer 122, as will be described more fully below. The host computer system preferably includes a central processing unit (CPU) 128 for executing various soft, rare programs, which are loaded into the main memory 126 from a permanent magnetic storage device, such as a hard drive or floppy drive device, and executed by the CPU 128, although other similar configurations are possible.

It is understood that the particular embodiment shown in FIG. 1 is only one of many possible implementations of a graphics system for use in a personal computer system. FIG. 1 is simplified for purposes of clarity, and many control signals are not shown. In the preferred embodiment, the graphics processor 100 provides hardware support for 2D and 3D graphics, text and windowing operations of a computer system. The graphics processor 100 transfers digital data between the main memory 126, the private memory 116, the frame buffer 110 and the Z-buffer 122, and processes the data for storage in the frame buffer 110 for ultimate display on the display device 112.

Referring now to FIG. 2, a simplified block diagram of the graphics processor 100 is shown. The host data bus of the HBUS 114, comprising the signals HDATA[31:0], is connected to screen and refresh logic 200, an interpolation engine and associated registers (polyengine) 202, instruction decode and control logic 204, a register file 205 and pixel alignment logic 208. The HBUS 114 also preferably provides a 33 MHz clock signal CK, which synchronizes data flow and logic within the graphics processor 100. The screen and refresh logic 200 provides row and column address signals to the frame buffer 110 and to the Z-buffer 122 during refresh cycles. The polyengine 202 preferably receives and stores vector data or parameters from the register file 205 for points, lines, polylines, polygons, and other geometric quantities, and then calculates or otherwise interpolates pixel position, color intensity, depth and transparency or alpha-blending for the various geometric quantities and characteristics. The polyengine 202 also determines address values for bit-block data transfer operations and provides color intensity values and depth values to an operation engine 212. The register file 205 is preferably a set of registers forming a read/write pre-storage and instruction queuing buffer for storing data and commands, and will be described more fully below. The registers of the register file 205 are connected and accessible to the control logic 204 and the polyengine 202. The operation engine 212 generally performs alpha blending functions, color logic operations as well as compare and masking functions.

The instruction decode and control logic, or simply the control logic 204, provides control signals, generally referred to by the letter C to all of the functional blocks described herein of the graphics processor 100. Graphics instructions are preferably read from the private memory 116 (or host memory 126) and loaded into an instruction queue (not shown) and then into an instruction register 420 (FIG. 4) within the register file 205. The control logic 204 then executes the instruction by asserting the necessary control signals C for determining synchronization and data flow according to the particular instruction.

The pixel alignment logic 208 includes two three-input multiplexors 208a, 208b each having two inputs coupled to the host data bus and local data bus, and outputs coupled to the inputs of two registers 208c, 208d, respectively. The output of the register 208c is provided to the third input of mux 208b and to one input of a two-input barrel shifter 208e. The output of the register 208d is provided to the third input of the mux 208a and to the other input of the barrel shifter 208e, having its output providing output pixel values to a set of input first-in, first-out latches (IFIFOs) 210 and also directly to the operation engine 212. The muxes 208a, 208b allow the graphics processor 100 to receive data from either the host or local data buses, or a combination thereof. The barrel shifter 208e allows alignment of pixel data as desired.

The local data bus of the LBUS 118 is provided to Z-buffer comparator logic 206 and also to the pixel alignment logic 208. The Z-buffer comparator logic 206 is generally used for 3D operations for controlling the data to be displayed in overlap or transparency situations. Depth data values stored in the Z-buffer 122 are compared with depth values interpolated by the polyengine 202. The outputs of the Z-buffer comparator logic 206 and the operation engine 212 are provided to output FIFOs (OFIFOs) 214. The outputs of the OFIFOs 214 are provided to the inputs of set of buffers 215, comprising a first set of tri-stateable buffers 215a for providing outputs to the local data bus, and a second set of tri-stateable buffers for providing outputs to the host data bus. The IFIFOs 210 and the OFIFOs 214 decouple the dynamic interface of the memories 110, 116 and 122, and the IFIFOs 210 synchronize source data for the operation engine 212 for read-modify-write (RMW) operations. The buffers 215a, 215b allow data from the OFIFOs 214 to be provided to the local data bus, the host data bus, or both. The muxes 208a, 208b and the tri-stateable buffers 215a, 215b allow complete flexibility of data flow between the LBUS 118 and HBUS 114, so that data can be transferred from the private memory 116 to the frame buffer 110 or the Z-buffer 122, and vice versa.

A first memory controller (MC1) 216 provides address signals to one input of a two input bus multiplexor (mux) 217 and to one input of another two-input bus mux 219. The output of the mux 217 is connected to the host address bus of the HBUS 114 for asserting address signals to the private memory 116 and the transceivers 106. A second memory controller (MC2) 218 provides address signals to the second inputs of the muxes 217, 219. The output of the mux 219 is connected to the local address bus of the LBUS 118 and provides address signals to the Z-buffer 122, the FPGA 104 and the frame buffer 110. The select inputs of the muxes 217, 219 receive signals S1, S2, respectively, provided from the control logic 204. In general, the graphics processor 100 operates in either a coprocessor or processor mode where the CPU 128 or the graphics processor 100, respectively, controls the system bus 102 for providing data and instructions to the graphics processor 100 for execution. A coprocessor mode is thus implemented where an external device such as the host CPU 128 asserts address signals to the graphics processor 100 for accessing the register file 205. For programming different addressing modes as described below, the registers of the register file 205 are preferably connected and accessible to the memory controllers MC1, 216, MC2 218. The preferred embodiment primarily concerns the graphics processor 100 operating in the processor mode.

Figure 3A:
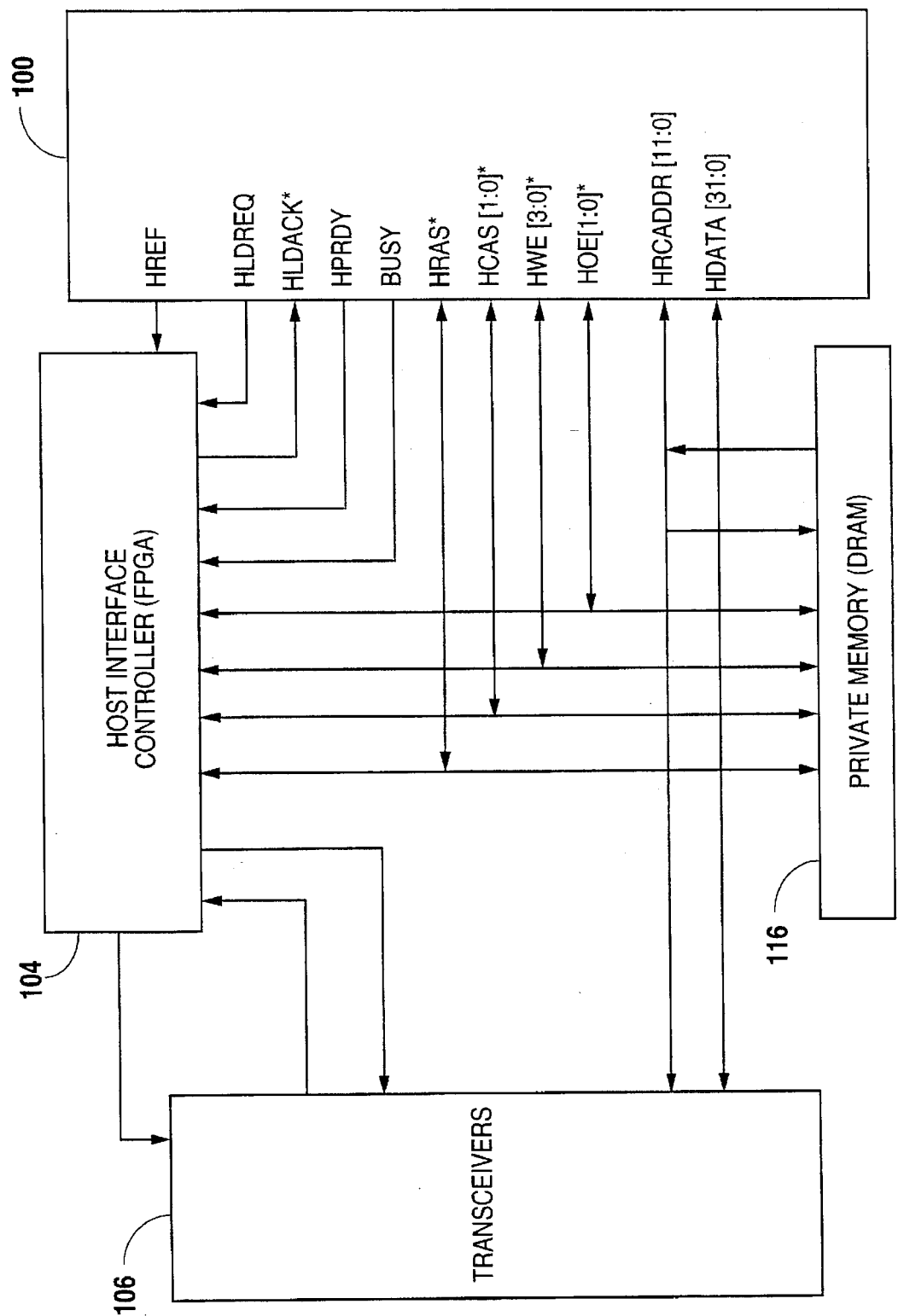
FIGS. 3A and 3B are block diagrams illustrating the host and local bus interfaces, respectively, of the graphics processor of FIG. 1.

Referring now to FIG. 3A, a more detailed block diagram is shown illustrating the signal connections between the graphics processor 100, the transceivers 106, the FPGA 104 and the private memory 116. Although the host address bus signals are asserted directly by the mux 217, it is understood that these signals are indirectly asserted by the MC1 216 or the MC2 218 depending upon the S1 signal. In the preferred embodiment, the memory controllers MC1 216 and MC2 218 are implemented as state machines within the control logic 204, although they are separated for purposes of illustration. The various control signals described herein related to the address signals are generally asserted by the control logic 204, although they will be referred to as being asserted generally by the graphics processor 100.

A host DRAM refresh signal, referred to as HREF, is asserted by the graphics processors 100 to the FPGA 104 indicating that the graphics processor 100 requires access to the HBUS 114 to either perform DRAM refresh cycles of the private memory 116, or otherwise to indicate that such cycles are already in progress. A host interface hold request signal, referred to as HLDREQ, is asserted by the graphics processor 100 to the FPGA 104 to indicate that the graphics processor 100 desires control of the HBUS 114. Correspondingly, the FPGA 104 asserts a host interface hold acknowledge signal, referred to as HLDACK*, which indicates that the host computer system has granted control of the HBUS 114 to the graphics processor 100. An asterisk (*) at the end of a signal name denotes negative logic where the signal is normally considered asserted when low or at logical zero and negated when high or at logical one. Otherwise, signal names generally conform to positive logic where the signal is asserted when high and negated when low. The HLDREQ and HLDACK* signals are used by the graphics processor 100 to arbitrate for control of the HBUS 114, where the graphics processor 100 drives the HBUS 114 when both the HLDREQ and HLDACK* signals are asserted.

A host port ready signal, referred to as HPRDY, is asserted by the graphics processor 100 to the FPGA 104 to indicate to the host computer system that the graphics processor 100 is ready to accept another instruction. The HPRDY signal is only used for a co-processor mode, since otherwise the graphics processor 100 fetches the next instruction from either the main memory 126 or from the private memory 116. A BUSY signal is asserted by the graphics processor 100 to the FPGA 104 to indicate that the graphics processor 100 is busy executing an instruction. The BUSY signal in combination with the HPRDY signal indicates the state of the instruction prefetch queue within the instruction decode and control logic 204.

A host row address strobe signal, referred to as HRAS*, is connected between the graphics processor 100, the FPGA 104 and the private memory 116, and is asserted when a valid row address has been driven onto the HBUS 114. The HRAS* signal is input to the graphics processor 100 when the HLDREQ signal is negated and is provided by the graphics processor 100 when both the HLDREQ and HLDACK* signals are asserted. Two host column address strobe signals referred to as HCAS [1:0]* are connected between the graphics processor 100, the FPGA 104 and the private memory 116, which are asserted to indicate that a valid column address has been driven onto the host address bus, comprising individual bus signals HRCADDR[11:0].

Preferably, two signals are provided for increased output drive capability, although they will collectively be referred to as the HCAS* signal. The HCAS* signal is provided to the graphics processor 100 from an external device when the HLDREQ signal is negated and are asserted by the graphics processor 100 when both the HLDREQ and HLDACK* signals are asserted. The HRAS* and HCAS* signals are bi-directional signals driven by an external controller to address the graphics processor 100 for reads and write cycles or for instruction loading when the HLDREQ signal is negated. These signals are driven by the graphics processor 100 to access instructions or data from the main memory 126 or from the private memory 116.

Four host write enable signals, referred to as HWE[3:0]*, are individual write enables for each byte of the host data bus of the HBUS 114, comprising individual bus signals HDATA[31:0]. The HWE[3]*, HWE[2]*, HWE[1]*, HWE[0]* signals correspond to the HDATA[31:24], HDATA[23:17], HDATA[16:8] and HDATA[7:0] signals, respectively. Two host output enable signals, referred to as HOE[1:0]*, are provided to the graphics processor 100 by an external device when the HLDREQ signal is negated, which causes the graphics processor 100 to provide data on the HDATA[31:0] signals. Again, two identical signals are preferably provided for increased drive capability, although they will be collectively referred to as the HOE* signal. The HOE* signal is asserted by the graphics processor 100 when both the HLDREQ and HLDACK* signals are asserted to access instructions or data from an external memory, such as the main memory 126 or the private memory 116. The HWE[3:0]* and the HOE* signals are bi-directional host write and output enable signals to allow an external controller of the HBUS 114 to access the registers of the graphics processor 100 or for loading instructions and parameters into the graphics processor 100. These signals also allow the graphics processor 100 to access instructions or data from the main memory 126 or from the private memory 116.

The host address bus for the HBUS 114 comprising signals HRCADDR[11:0] are bi-directional host row and column address signals driven by an external controller, such as the host CPU 128, to address the registers of the graphics processor 100 for reads and writes or for instruction and parameter leading when the HLDREQ signal is negated. When both the HLDREQ and HLDACK* signals are asserted, the HRCADDR[11:0] signals are driven by the mux 217 of the graphics processor 100 to access instructions or data from the main memory 126 or from the private memory 116. To achieve a full address, a row address is asserted on the HRCADDR[11:0] signals and the HRAS* signal is asserted to precharge the DRAMs, and then a series of column addresses are asserted on the HRCADDR[11:0] signals and the HCAS* signal is strobed accordingly. In the preferred embodiment, the graphics processor 100 is connected to the host computer system through the transceivers 106 and is directly connected to the DRAMs of the private memory 116. As will be described below, these signals are asserted as outputs from the graphics process 100 to provide a linear or X/Y address. The host data bus transfers data and instructions to and from the host computer system, which includes the host CPU 128 and the main memory 126. The controller of the host data bus changes on a cycle to cycle basis depending upon the mode of the graphics processor 100, and whether data is being read or written.

Figure 3B:
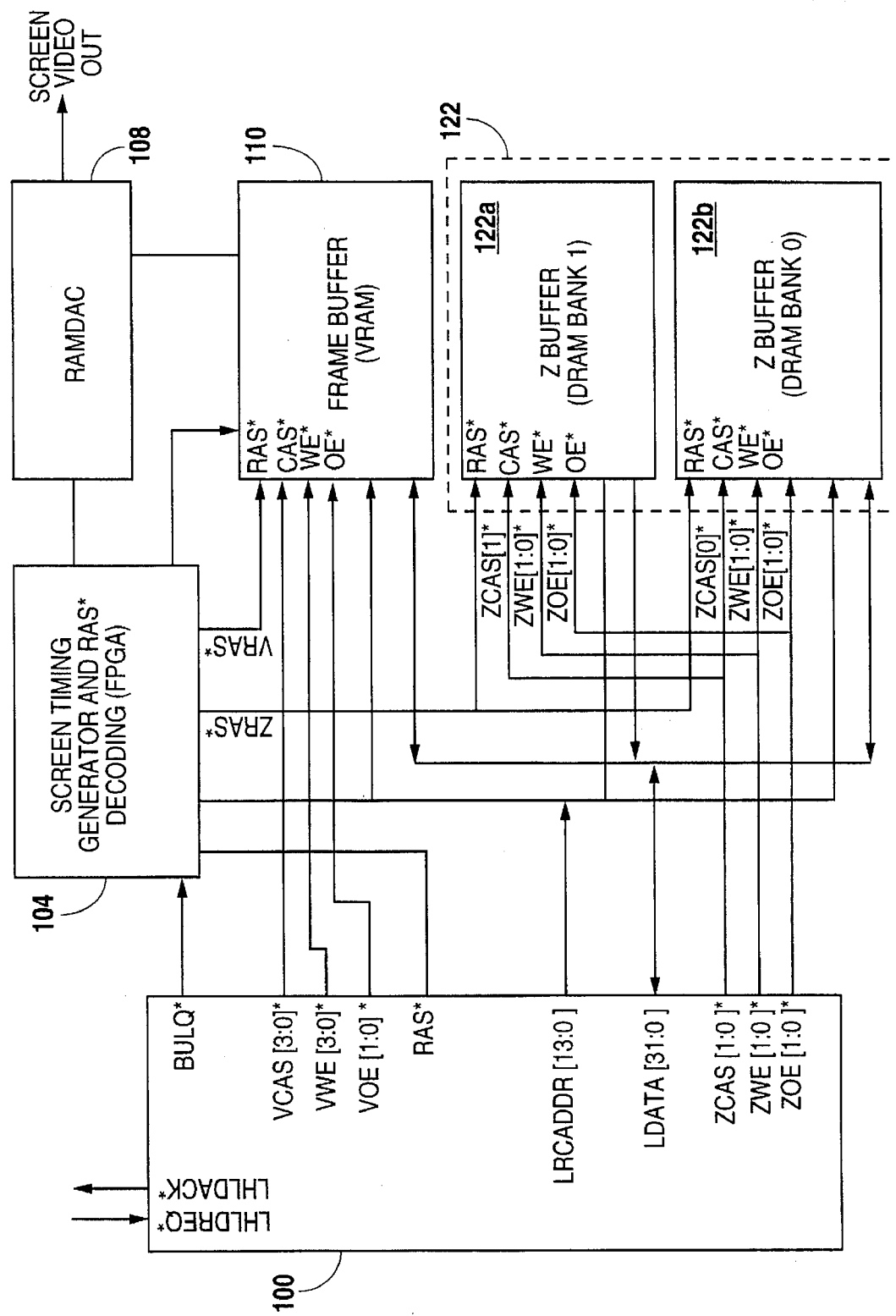

Referring now to FIG. 3B, a block diagram is shown illustrating the signal connections between the graphics processor 100, the FPGA 104, the RAMDAC 108, the flame buffer 110 and the Z-Buffer 122. The Z-Buffer 122 is preferably split into two banks, a first bank 122a and a second bank 122b. The local address bus comprising fourteen signals, LRCADDR[13:0] is a tri-statable row/column address bus connected to the frame buffer 110 and the Z-Buffer 122, and is driven by the mux 219 of the graphics processor 100 for read and write cycles. The LRCADDR[13:0] signals are preferably directly connected to the frame buffer 110 and Z-Buffer 122 and is reconfigurable for various screen sizes and memory address widths. The LBUS 118 further includes a local data bus comprising signals LDATA[31:0] which are bidirectional data bus signals for transferring pixel data between the graphics processor 100, the frame buffer 110 and the Z-buffer 122.

A local interface hold request signal, referred to as LHLDREQ*, is provided to the graphics processor 100 by a device wanting to gain control of the LBUS 118. A corresponding local interface hold acknowledge signal, referred to as LHLDACK*, is asserted by the graphics processor 100 to indicate that it has granted control of the LBUS 118 to another bus master. A signal BULQ* is asserted by the graphics processor 100 to the FPGA 104 while the LHLDACK* signal is asserted to indicate to a device controlling the LBUS 118 that the graphics processor 100 must have control of the LBUS 118 to perform urgently needed DRAM refresh cycles. If the BULQ* signal is asserted when the LHLDACK* signal is negated, this indicates that the DRAM refresh cycles from the graphics processor 100 are in progress. Thus, the BULQ* signal indicates the beginning of a DRAM refresh cycle and remains asserted while the refresh cycle is in progress.

Four screen memory column address strobes, referred to as signals VCAS[3:0]*, are asserted by the graphics processor 100 to the CAS* inputs of the DRAMs comprising the frame buffer 110 to indicate a valid column address has been driven by the graphics processor 100 onto the LRCADDR[13:0] address signals. Individual signals are provided for each byte of the LDATA[31:0] signals, where VCAS[3]*, VCAS[2]*, VCAS[1]* and VCAS[0]* correspond to HDATA[31:24], HDATA[23:17], HDATA[16:8] and HDATA[7:0] data signals, respectively. Four screen memory write enables, referred to as VWE[3:0]*, provide individual write enables for each byte of the local data bus, where the VWE[3]*, VWE[2]*, VWE[1]* and VWE[0]* signals correspond to the LDATA[31:24], LDATA[23:17], LDATA[16:8] and LDATA[7:0] data signals, respectively. The VWE[3:0]* signals are tri-stated when the LHLDACK* signal is asserted.

Four screen memory output enable signals, referred to as VOE[3:0]*, are provided for the four bytes of the LDATA[31:0] signals in a similar manner as for the VWE signals. The VWE[3:0]* and the VOE[3:0]* signals are tristatable screen memory write and output enables driven by the graphics processor 100 to access or transfer pixel data to and from the screen memory VRAMs of the frame buffer 110 when the LHLDREQ* signal is negated. These signals are tri-stated when both the LHLDREQ* arid LHLDACK* signals are asserted. The VOE[3:0]* signals are used to output enable the VRAMs, as well as to perform transfer cycles inside the VRAMS for screen refresh support. In this manner, four separate enable signals are provided for reading and writing selected bytes on the local data bus.

A local row address strobe signal, referred to as RAS*, is asserted when a valid row address has been driven onto the LRCADDR[13:0] signals. The RAS* signal is tri-stated when the LHLDACK* signal is asserted. It is noted that the RAS* signal is provided to the FPGA 104, which in mm provides corresponding signals VRAS* to the RAS* inputs of the VRAMs of the frame buffer 110 and another signal ZRAS* to the RAS* inputs of DRAMs of both the banks 122a and 122b of the Z-Buffer 122.

Two column address strobe signals, referred to as ZCAS [1:0]*, are provided to the GAS* inputs of the DRAMs of the Z-Buffer 122. The ZCAS[1:0]* are individual column address strobes for each bank 122a and 122b of the two-way interleaved Z-Buffer 122. These signals are tri-stated when the LHLDACK* signal is asserted. It is noted that only one of these strobe signals are necessary if the Z-Buffer 122 is not organized into two banks 122a and 122b. Two write enable signals, referred to as ZWE[1:0]*, are individual write enables for each half (16 bits) of the LDATA[31:0] signals, where ZWE[1]* corresponds to the LDATA[31:16] signals and ZWE[0]* corresponds to the LDATA[15:0] signals. The ZWE[1:0]* signals are tri-stated when the LHLDACK* signal is asserted. Two output enable signals, referred to as ZOE[1:0]*, are individual output enables for each word of the LDATA[31:0] signals in a similar manner as described above for the ZOE[1:0]* signals. It is noted that both the ZWE[1:0] and ZOE[1:0] signals are tri-statable depth memory write and output enables driven by the graphics processor 100 to access or transfer depth data to and from the Z-Buffer 122 when the LHLDREQ* signal is negated. These signals are tri-stated when both LHLDREQ* and LHLDACK* signals are asserted.

Figure 4:
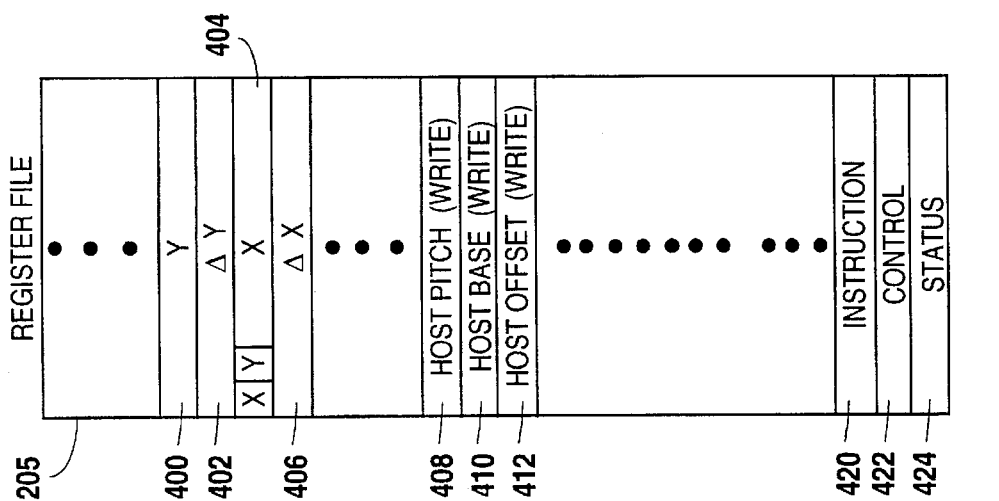
FIG. 4 is a register file located in the graphics processor of FIG. 1.

FIG. 4 shows some of the more important registers within the register file 205 for purposes of the present invention. Each of the registers are preferably 32 bits in length for purposes of convenience, although other lengths are possible. Two registers 400 and 404 preferably hold Y and X address values, respectively, for identifying the location of an object defined by pixel values in the frame buffer 110. Addresses for objects drawn in the frame buffer 110 start from an initial X, Y address, and the address values are then preferably interpolated using the polyengine 202. The most significant two bits (MSBs) of the X register 404 define the direction for increasing address values while being interpolated, referred to as DIRx and DIRy, respectively, which are preferably both zero for increasing X addresses from left to right (relative to the display screen 112) and increasing Y addresses from top to bottom. The two direction bits DIRx, DIRy allow complete flexibility when writing pixels in to the frame buffer 110.

A ΔY register 402 identifies an incremental row value added to the address value in the Y register 400 when interpolating an object or data. However, the ΔY value will preferably be considered one for purposes of the present invention for incrementing to the next horizontal scan line within the frame buffer 110. A ΔX register 406 generally works in a similar manner as the ΔY register 402 and preferably contains an incremental column value for adding to the value in the X register 404 during interpolation. However, this value is either set to one or is not used for purposes of data transfer, where the column address is simply incremented, or decremented, to get to the adjacent column. However, when interpolating lines, polylines, triangles, polygons, etc., this register is used by the polyengine 202. Although not shown, the register file 205 contains a plurality of other related registers, such as Z and ΔZ registers for purposes of interpolating depth values in the Z-buffer 122, but operate in a similar manner and will not be described further. It is further noted that the X and Y registers 400, 402, 404 and 406 include integer and fractional components for purposes of accuracy. For purposes of simplification, however, this will not be described further as not necessary for purposes of the present invention.

A HOST_BASE register 410 identifies the initial starting or base address when writing or reading data into the private memory 116. A HOST_PITCH register 408 is provided for identifying when a new line begins while writing data into the private memory 116. Thus, the value in the HOST_PITCH register 408 represents how many "x-counts" or bytes are added to the base address in the HOST_BASE register 410 before incrementing to the next line of data, where a line of data is relative to the width of an object in the frame buffer 110. Generally, the pitch of the frame buffer 110 is fixed at 4,096, which is preferably equivalent to the number of pixels in each horizontal scan line. A value of 4,096 in the HOST_PITCH register 408 enables X/Y addressing of the private memory 116. Other values loaded into the HOST_PITCH register 408 allows linear addressing of the private memory 116, as will be described more fully below. A HOST_OFFSET register 412 is used for indirect addressing of the private memory 116 defining an address offset relative to the address value in the HOST_BASE register 410. A single set of pitch, base and offset registers are sufficient unless reading from one location to another within the private memory 116. In that case, the Y, ΔY and X registers 400, 402 and 404 are also used as address generators.

The register file 205 also includes the instruction register 420 for storing commands and functions, a control register 422 for containing various control bits for defining particular modes for respective instructions and operations, and a status register 424 for controlling software transport protocol, for enabling and determining pending interrupts and for storing various result flags.

Figure 5:
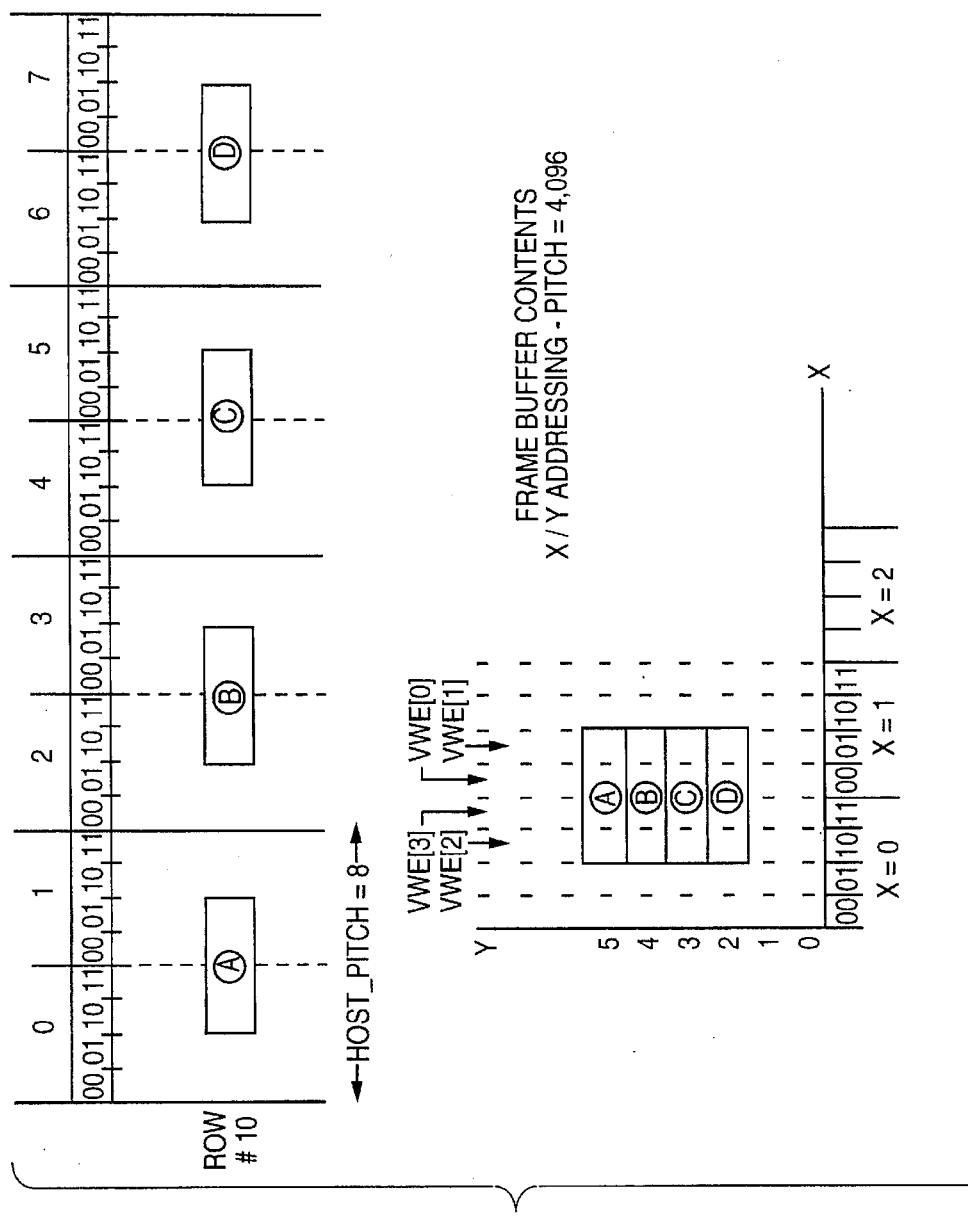
FIG. 5 is a diagram illustrating linear to X, Y addressing conversion.

Referring now to FIG. 5, a diagram is shown illustrating address conversion from linear format to X/Y format for transferring data from the private memory 116 to the frame buffer 110 through the graphics processor 100. A dual interface structure according to the present invention allows such address conversion or translation automatically while transferring data from one location to another.

The HOST_PITCH register 408 is loaded with a value of eight (8) and the pitch for the frame buffer 110 is set at a value of 4096. Four separate words A, B, C and D are stored in the private memory 116 consecutively in a series of memory words labelled 0 though 7. Each of the memory words 0–7 include four bytes or 32 bits, where each byte is addressed by two column bits 00, 01, 10 and 11. These particular column address bits are not asserted on the host address bus since all four bytes are read at once into the graphics controller 100. The data words A–D are not aligned to column boundaries within the memory words 0–7, so that the second two bytes 10, 11 of the memory word 0 and the first two bytes of the memory word 1 are required to form the data word A. The data is written into the frame buffer 110 in X/Y addressing format, so that each of the data words A–D are stacked on top of each other. More particularly, the data words A–D are stored in a rectangular area between row addresses Y=5 to Y=2 and in column addresses X=0 and X=1, where each of the column addresses include four pixel bytes, 00, 01, 10 and 11.

The MC1 216 thus reads seven memory words 0–7 from the private memory 116 in linear format, where each word is four bytes in length. The row is maintained at address 10, and the column address is increased linearly from 0000 to 0111 for memory words 0 through 7 for all seven words within the private memory 116. However, when writing into the frame buffer 110, the value starts at row address Y=5, column address X=00 and continues until eight bytes or two words are written, including the data word A, thereby completing the first line of pitch 8, and then the pitch value of 4,096 is added to the base or initial x column address causing the row address to be decremented to begin at row Y=4, column X=00 to begin a new memory line containing the data word B. Operation continues in this manner until the four data words A, B, C and D are aligned on top of one another in the rows Y=5 to Y=2 in the frame buffer 110.

Figure 6:
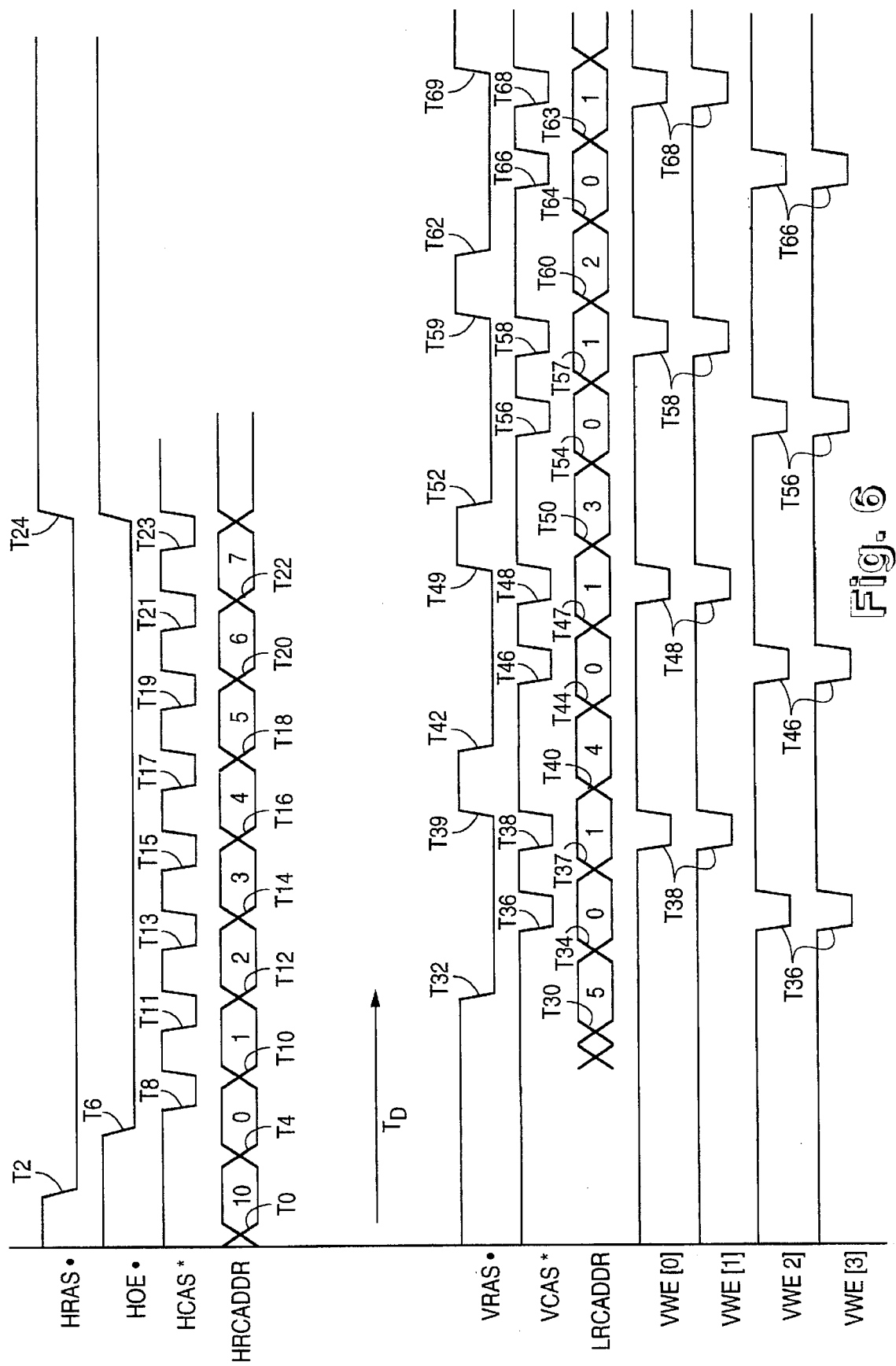
FIG. 6 is a timing diagram illustrating address conversion from linear to X, Y during data transfer.

FIG. 6 is a timing diagram illustrating operation of the MC1 216 and the MC2 218 performing address conversion while reading data from the private memory 116 and writing data into the frame buffer 110. In particular, the MC1 216 is first programmed to linearly read data from the private memory 116 stored in a linear addressing format. The S1 signal is asserted to select the MC1 216 for asserting address signals on the host address bus. Data read by the MC1 216 is selected by either max 208a, 208b for input data, which traverses through the operation engine 212 and is loaded into the OFIFOs 214. The buffers 215a assert the data on the local address bus. The MC2 218 is programmed to address the frame buffer 110 in X/Y addressing format while data is provided on the local data bus from the OFIFOs 214. The S2 signal is asserted to select the MC2 218 for asserting address signals on the local address bus. The X and Y register 404, 400 are loaded with values 0 and 5, respectively, for pointing to the initial point for inserting data into the frame buffer 110.

The graphics processor 100 is capable of addressing up to 8 Megabytes worth of data stored in the private memory 116 using the HRCADDER[11:0] signals by first asserting a row and then a series of column addresses as known to those skilled in the art. Thus, the graphics processor 100 asserts an address on the host address bus and then asserts the HRAS* signal low to precharge the DRAMs within the private memory 116. Then, the graphics processor 100 asserts a series of column addresses on the host address bus while correspondingly asserting the HCAS* signal for each column address. Typically, data stored in the private memory 116 is addressed in linear format, where the column address begins at zero and is subsequently incremented until it reaches the very end of the row, thereby linearly addressing every bit within the memory.

In the X/Y addressing format, a row address is asserted and the corresponding RAS* signal is synchronously asserted on the respective address bus, and then a series of column addresses are asserted and the corresponding GAS* signals are synchronously asserted until the number of column addresses equals the pitch value. When the pitch value is reached, the row address is either incremented or decremented, and the pitch value is added to the base column address to begin a new line. However, when reading data from the private memory 116 in linear format and while writing the data to the flame buffer 110 in X/Y format, the pitch value of 4,096 is added to the X register 404 to begin a new line. In this manner, an object having a certain width defined in pixels in the frame buffer 110, and a certain height defining a window of scan lines, can be stored in the private memory 116 in relatively compressed format.

Operation begins at a time T0, when the MC1 216 asserts the row address 10 on the HRCADDR[11:0] signals or host address bus. The graphics processor 100 then asserts the HRAS* signal low at a time T2 to indicate that a valid row address has been asserted on the HBUS 114. Subsequently at a time T4, the graphics processor 100 asserts a column address 0 to the private memory 116 for accessing the memory word 0. While the column address is valid, the graphics processor 100 asserts the HOE* signal low at a time T6 to access data and then asserts the HCAS* signal low at a time T8 indicating that a valid column address is asserted on the host address bus. Meanwhile, the corresponding data word 0 from the private memory 116 is provided to the host data bus and latched into the graphics processor 100 although not explicitly shown. Subsequently, the remaining memory word addresses 1, 2, 3, 4, 5, 6 and 7 are asserted on the host address bus at times T10, T12, T14, T16, T18, T20 and T22, respectively, and the HCAS* signals are synchronously asserted while the column addresses are valid at times T11, T13, T15, T17, T19, T21 and T23, respectively, for latching in the corresponding memory words 1, 2, 3, 4, 5, 6 and 7, respectively.

Meanwhile, after the OFIFOs 214 become full, the MC2 218 asserts the row address Y=5 on the local address bus of the LBUS 118 for writing data to the frame buffer 110 at that row. The RAS* signal is subsequently asserted by the graphics processor 100 to the FPGA 104 which subsequently asserts the VRAS* signal at a time T32 while the address Y=5 is still valid on the LBUS 118. It is noted that from the beginning of the cycle at approximately T0, a time delay of $T_D$ occurs until the time T32 when the VRAS* signal is asserted. This time delay $T_D$ is primarily due to the time it takes for data to propagate through the pixel alignment logic 208, the IFIFOs 210, the operation engine 212 and through the OFIFOs 214 before data can be provided to the private memory 116. It is noted that although data is typically modified or otherwise operated on through the operation engine 212, data can also be simply passed unchanged through the operation engine 212 and provided to the OFIFOs 214 for storage in the frame buffer 110. It is further noted that the time T32 does not necessarily occur after the time T24 at the end of the HBUS 114 cycle, but instead preferably occurs while the cycle on the HBUS 114 is occurring. In fact, the only delay from time T0 is the time $T_D$ for allowing the data to propagate through the graphics processor 100 before data can be provided at the OFIFOs 214 and onto the LBUS 118.

Once the row address Y=5 is latched by the VRAMs of the frame buffer 110, the graphics processor 100 asserts the first column address 0 at a time T34 and subsequently asserts the corresponding VCAS* signals at a time T36. Furthermore, the write enable signals VWE[2,3]* are asserted approximately at the time T36 to write only the bytes of interest into the frame buffer 110 at address Y=5 and at column address 2. Note that the first two bytes 00, 01 are not defined and that the second two bytes 10, 11 form the first half of the data word A. Subsequently at time T37 a new column address of X=1 is asserted on the LBUS 118 and then the corresponding VCAS* and write enable signals VWE[0,1 ]* are asserted subsequently at a time T38 to access the address location Y=5 and X=1 within the frame buffer 110, and to write only the first two bytes of interest 00, 11 to complete the data word A. The cycle ends at a time T39 when the VRAS* and corresponding signals are negated, thereby completing the writing of the data word A into the frame buffer 110 at row address Y=5. Since 8 bytes of data have been written into the frame buffer 110 and the HOST_PITCH value of 8 has been reached, the pitch value of 4,096 of the frame buffer 110 is added to the X register 404 and the Y address is decremented to begin a new scan line.

Subsequently at time T40, the new row address Y=4 is asserted on the local address bus signals of the LBUS 118 and then the VRAS* signal is asserted subsequently at a time T42 indicating that a valid row address has been asserted. Once the VRAMs within the frame buffer 110 have latched row address and have precharged, the graphics processor 100 asserts consecutive column addresses X=0 and X=1 at times T44 and T47 respectively in a similar manner described previously. Likewise, the VCAS* signals and the corresponding VWE[2,3]* write enable signals are asserted at time T46 to latch the X=0 column address, and then at a time T48 to latch the X=1 column address, and corresponding VWE[]* write enable signals are asserted. Again, only the VWE[2,3]* signals are asserted for X=0 and the VWE [0,1]* signals are asserted for X=1 to latch the appropriate data bytes of the local data bus for the data word B. This completes the second row of data written to the frame buffer 110 for correspondingly writing the data word B into the frame buffer 110. Operation proceeds in an almost identical manner, where the graphics processor 100 asserts row addresses, Y=3 and Y=2 at times T50 and T60, respectively, and also asserts column addresses X=0, 1 at times T54, T57 and T64, T67, respectively. The VRAS* signals are asserted appropriately to latch the row addresses at times T52 and T62 and the VCAS* and VWE[4:0]* are asserted as shown in the diagram to write the data words C and D at rows 3 and 2, respectively,into the frame buffer 110. The entire operation completes at a time T69 when all signals are negated, completing the write operation.

Figure 7:
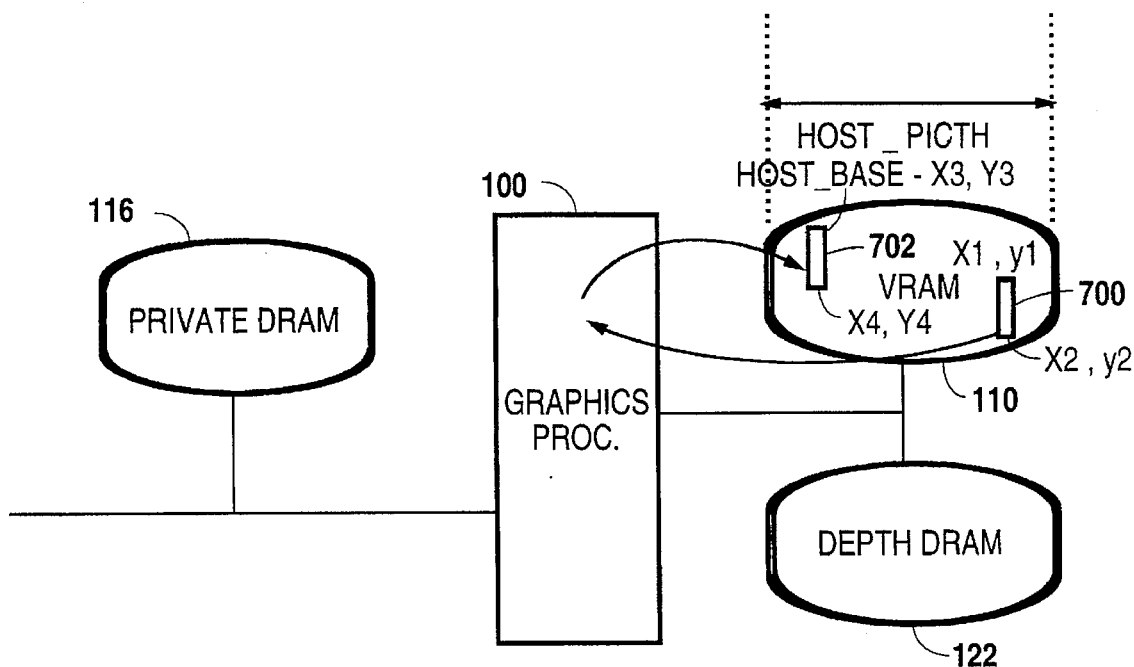
FIG. 7 is a diagram illustrating a window move from one location to another within the frame buffer of FIG. 1.

It is clearly seen from FIGS. 5 and 6 that the dual interface architecture according to the present invention enhances the speed and thus the efficiency of the graphics processor 100. While data is being read from the private memory 116 in linear addressing format, data is simultaneously written into the frame buffer 110 in X/Y addressing format, although a slight delay $T_D$ occurs for data propagation through the graphics processor 100. The time delay $T_D$ is a minor penalty compared to prior art using a single memory controller where data clearly cannot be read and written simultaneously. It is clear that moving data from one memory location to another while simultaneously converting the addressing format, such as from linear to X/Y or vice-versa, would be very tedious and slow with a single memory controller. The memory Controller would have to be reprogrammed for each line of data, or a large internal memory would need to be provided within the graphics processor 100 to store all the data from the source location, and then the memory controller would be reprogrammed to write the data from the internally stored location to the destination memory location. It is therefore seen that a dual interface architecture according to the present invention allows complete flexibility in storing and retrieving data from one memory location to another with different addressing formats. Referring now to FIG. 7, a simplified block diagram is shown illustrating the capability of moving a window of data from one location to another within the frame buffer 110. A rectangular source window 700 is shown between coordinates X1, Y1, and X2, Y2 to be moved to a destination pointed to by the HOST_ BASE register 410 starting with coordinates X3, Y3 and ending at coordinates X4, Y4. The LBMC 218 is preferably programmed to address the window 700 by initially pointing at the X1, Y1 address and reading data from the frame buffer 110 in X/Y format. In particular, the X, Y registers 404, 400 are set to X1, Y1 accordingly and the S2 signal is asserted to select the MC2 218 while data is being read. The data is asserted on the local data bus and provided to the pixel alignment logic 208, and eventually propagates through to the OFIFOs 214. The buffer 215a remains tri-stated, however, while data is being read until ready to be written.

The HBMC 216 is programmed in X/Y format by setting the HOST_PITCH register 408 to 4096 and setting the HOST_BASE register 410 to X3, Y3 to write the data beginning at X3, Y3 and ending at X4, Y4 of the destination window 702. When the data from the window 700 fills the OFIFOs 214, the HBMC 216 addresses corresponding data locations within the frame buffer 110 for writing the data to the window 702. It is noted that the read and write operations cannot occur simultaneously since accessing the same bus. Therefore, the LBMC 218 is temporarily stalled while the buffer 215a asserts data onto the local data bus to clear out the OFIFO 214. Once the data is cleared from the OFIFOs 214 and written into the window 702, additional data from the window 700 is read from the LBMC 218 thereby temporarily stalling the HBMC 216. Therefore, although the HBMC 216 and the LBMC 218 are not operated simultaneously, there is no need for reprogramming either memory controller MC1 or MC2 during the operation, so that data is always being read from or written to the frame buffer 110. In prior art, a single memory controller would have to be reconfigured between each move which calls for greater internal FIFO buffers or more data storage and a complete stall during reconfiguration for addressing data from the window 700 and writing data to the destination location at window 702. Such extra data storage and delay due to reconfiguration is entirely unnecessary using a dual interface architecture according to the present invention.

Figure 8:
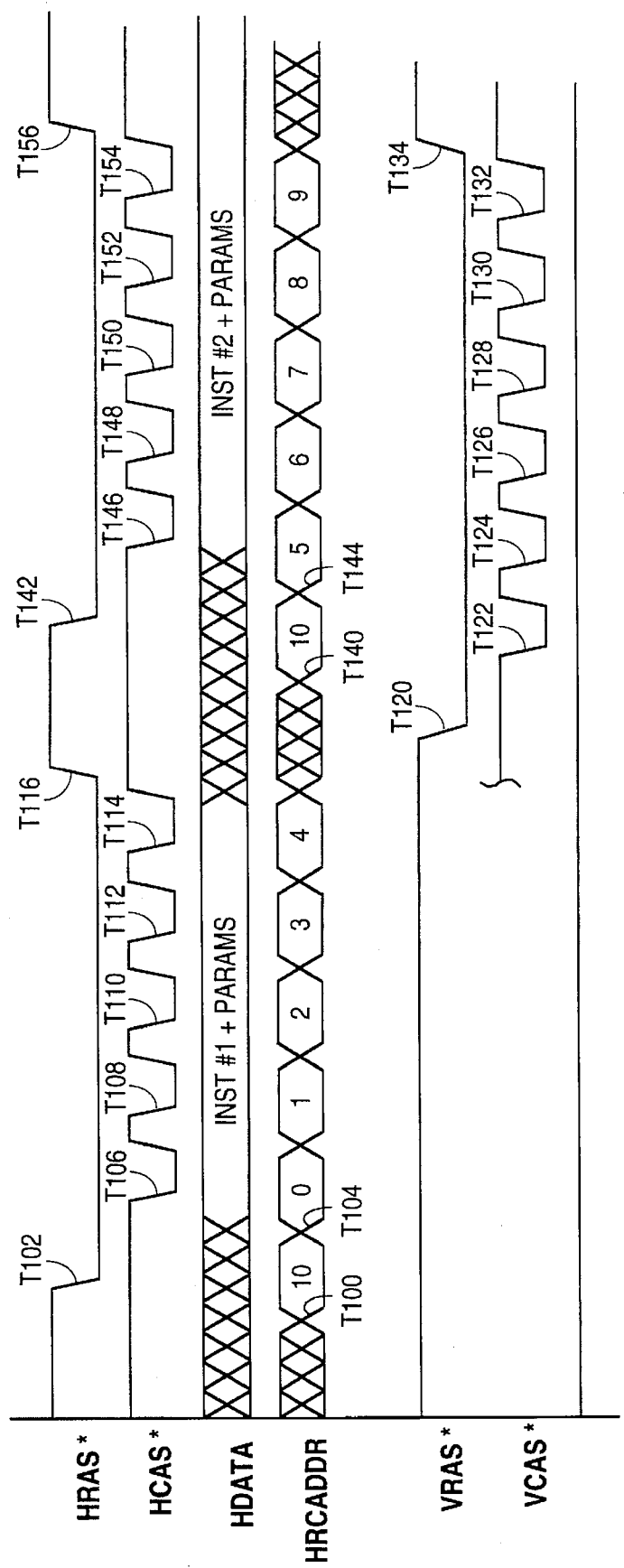
FIG. 8 is a timing diagram illustrating command pipelining capability of the graphics processor of FIG. 1.

Referring now to FIG. 8, a timing diagram is shown illustrating command pipe lining capability of the present invention where subsequent instructions are prefetched by the graphic processor 100 while simultaneously executing previously loaded instructions. In this case, the HBMC 216 is preferably programmed to fetch instructions and corresponding parameters for that instruction from the private memory 116 for loading into the register file 205, while the LBMC 218 is programmed to retrieve data from the operation engine 212 through OFIFOs 214 and write the data into the frame buffer 110 and/or Z-buffer 122. The polyengine 202 executes the first instruction and loads parameters from the register file 205 into its internal registers. Resulting output data is then provided to the operation engine 212. Thus, there is a slight delay while the first instruction is executing before data is written to the frame buffer 110. Nonetheless, once the data is available to be written to the frame buffer 110, it can immediately be written by the LBMC 218 simultaneously while the HBMC 216 retrieves new instructions and parameters from the private memory 116.

The HBMC 216 asserts a row address on the host address bus at time T100 and subsequently asserts the HRAS* signal at time 102 allowing the private memory 116 to latch the row address. Subsequently at time T104, the HBMC 216 asserts a column address 0 pointing to instruction #1 within the private memory 116, and then asserts the HCAS* signal at time T106 indicating a valid column address is asserted on the host address bus. The private memory 116 asserts the data comprising instruction #1 onto the host data bus which is written into the register file 205. Subsequently, valid column addresses pointing to the parameters of instruction #1 within the private memory 116 are asserted on the host address bus by the graphics processor 100 and the HCAS* signal is asserted while the column addresses are valid during times T108, T110, T112, and T114, so that instruction #1 and all its parameters are loaded into the register file 205. The first cycle completes at time T116 when the HRAS* signal is negated. Almost immediately thereafter, the polyengine 202 begins executing instruction #1 and providing data through the operation engine 212 to the OFIFOs 214. Once data is available to be written to the frame buffer 110, the LBMC 218 takes over and writes a row address and the VRAS* signal is asserted at time T120, and then the graphics processor 100 asserts corresponding VCAS* signals at times T122, T124, T126, T128, T130, and T132 as shown for writing data into the frame buffer 110. The first data set is complete at a time T134, when the VRAS* signal is negated although further data sets can be written according to the requirements of instruction #1.

Meanwhile, before the polyengine 202 has completed the execution of the first instruction and before all the data is written into the frame buffer 110, the HBMC 216 asserts a new row address on the host address bus at time T140 and subsequently asserts the HRAS* signal at time T142 to begin retrieving instruction #2. The time T142 preferably occurs prior to time T134 before the first data line is written into the frame buffer 110. In fact, the HBMC 216 begins prefetching the next instruction #2 relatively soon after all of the parameters for instruction #1 have been loaded. Thereafter, the HBMC 216 asserts column addresses 5, 6, 7, 8, and 9 beginning at time T144 and correspondingly asserts the HCAS* signal at corresponding times T146, T148, T150, T152, and T154, consecutively and synchronously with the column addresses 5-9. The prefetch operation ends at time T156 when the HBMC negates the HRAS* signal. It is noted that although the polyengine 202 cannot begin operation of the next instruction #2 until instruction #1 is completed, execution can begin immediately thereafter since instruction #2 has been prefetched by the MC1 216.

It is therefore appreciated that the dual interface architecture according to the present invention provides a first memory controller for prefetching instructions while a prior instruction is being executed and the corresponding data is being written to an output memory device, such as the frame buffer 110 and/or the Z-buffer 122. Due to the OFIFOs 214, the HBMC 216 and the LBMC 218 operate asynchronously with respect to one another and need not wait for the other to complete execution. A single memory controller would not be able to prefetch instructions, but would have to be reprogrammed and begin writing data to the flame buffer 110, and then would have to be reprogrammed again for reading the next instruction from the private memory 116. Thus, a dual interface architecture according to the present invention allows instruction prefetching, thereby substantially increasing the speed and efficiency of the graphics processor 100.

Figure 9:
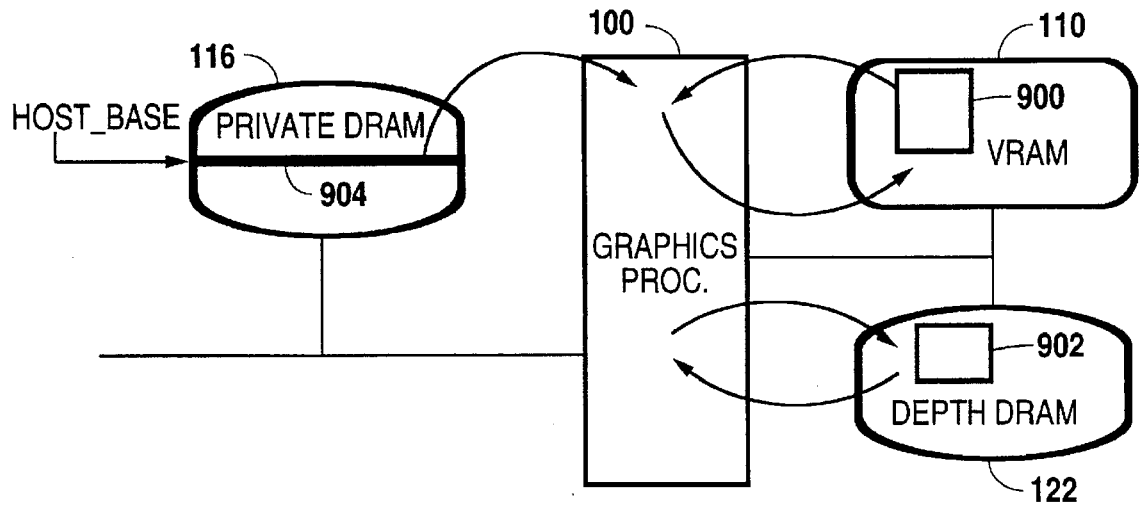
FIG. 9 is a diagram illustrating a complex blit operation using the graphics processor of FIG. 1.

Referring now to FIG. 9 a diagram is shown illustrating a complex blit operation where data is simultaneously retrieved from two separate memory locations. In this case, either a window 900 within the frame buffer 110 or a similar window 902 within the Z-buffer 122 is read by the graphics processor 100 and modified using data from the private memory 116. This is typically referred to as a read-modify-write operation. Although two separate window 900, 902 are shown, one each for the frame buffer 110 and the Z-buffer 122, only one is accessed during the complex blit operation. Data from the window 900 or 902 and the modifying data 904 from the private memory 116 are read simultaneously by the LBMC 218 and the HBMC 216, respectively. The complex blit instruction is useful for area smoothing, video and graphics blending and anti-aliasing raster font transfers at a very fast rate. In the case shown in FIG. 9, the modifying data 904 from the private memory 116 is read by the HBMC 216 in linear format, while the LBMC 218 reads the window 900 or 902 in X/Y format. The object is to bring in all of the data, align it using the pixel alignment 208, operate on the data, and then write the data back into the same location within the frame buffer 110 or the Z-buffer 122. It is noted, however, that the data could be written back into the private memory 116 as desired. Also, although data can be read simultaneously from the private memory 116 and the frame buffer 110 or the Z-buffer 122 using the two separate memory controllers MC1, MC2, the data cannot be written while being read since accessing the same LBUS 118. Thus, data is stored in the OFIFOs 214, and when ready for being written to the frame buffer 110 or the Z-buffer 122, the HBMC 216 is stalled while the LBMC 218 writes the data.

Once a data line has been written, both memory controllers HBMC 216, and the LBMC 218 can read more data for the operation engine 212 before being subsequently written by the LBMC 218. Although one of the memory controllers is temporarily stalled during this operation, data is always being read or written, which is not possible with a single memory controller of prior art. With a single memory controller, data would have to be read from the frame buffer 110 or the Z-buffer 122, and then the memory controller would have to be reprogrammed to read data from the private memory 116 before the data can be combined in the operation engine 212. Of course, when the data is ready to be written, the single memory controller would have to be reconfigured to write the data back out to the destination memories.

Other more complicated operations are performed faster and more efficiently using a dual interface architecture according to the present invention. Dual memory address controllers are used in the case of graphics texture mapping, where one address controller reads information in a nonlinear random format from a source location to allow the graphics processor 100 to develop u, v space for the appropriate texture mapping. Thus, one memory controller addresses the data in a nonlinear random fashion and the second memory controller writes the data in typical X/Y format into the destination memory. In this manner, a separate memory controller is provided for addressing data in a non-sequential random access format for texture mapping in u, v space.

Another advantage of two memory controllers is to align non-aligned data in a more efficient manner. In typical graphic operations, data is read from one pixel address and written to another pixel address. When moving data from one location to another, however, the data might not be aligned so that it is read from position one in the source scan line and written to position three in the destination scan line. Thus, more than one data word has to be read in order to retrieve the full single word to be written. FIG. 5 illustrates the point where it was required to read two words of memory to write one word of data, such as data word A, since the data crossed word boundaries. Thus, one address controller continually reads two pixels at a time from a source location while the other address controller continually writes a single data word back into a destination location for properly aligning data.

It is now appreciated that a graphics processor according to the present invention including two memory controllers to achieve a dual interface is a substantial improvement over single interface architectures. Data transfer rates from one memory location to another are performed more efficiently and significantly faster. Data stored in two separate formats, such as linear versus X/Y addressing, does not slow down the procedure since the separate memory controllers are accordingly programmed for the different modes of addressing. Data transfer between two separate locations within the same memory also occurs faster since one memory controller is programmed to read the source data and the other memory controller is programmed to write the destination data, so that delays for reconfiguring a single memory controller during the transfer are eliminated. Command pipelining for prefetching commands is now possible to eliminate delays retrieving the next command.

A graphics processor with a dual architecture according to the present invention also allows more sophisticated operations to be performed with speed. Such operations as texture mapping from u, v space and aligning non-aligned data during data transfer are performed with ease. Thus, a graphics processor according to the present invention performs high level graphics functions and data transfers much faster without depreciating the performance of the computer system at all.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A processor for coupling to first and second independent buses, the first and second buses each having address and data portions, said processor comprising:
    a first memory controller for providing address signals onto the address portion of the first bus;
    a second memory controller for providing address signals onto the address portions of the second bus;
    a set of latches for coupling to the data portions of the first and second buses; and
    control logic coupled to said first and second memory controllers and said set of latches for controlling data flow on the first and second buses.

2. The processor of claim 1, wherein:
    said first memory controller provides address signals on the first bus for addressing input data, wherein said input data is provided to an input of said set of latches; and
    wherein said second memory controller provides address signals on the second bus for writing output data provided from an output of said set of latches.

3. The processor of claim 1, wherein said first and second memory controllers are both programmable for asserting said address signals on the first and second buses in different formats.

4. The processor of claim 3, wherein said first memory controller is programmed for asserting address signals on the first bus in linear format for accessing and providing data to an input of said set of latches, and wherein said second memory controller is programmed for asserting address signals on the second bus in x/y format for writing data provided from an output of said set of memory latches.

5. The processor of claim 3, further comprising:
    memory coupled to said first and second memory controllers for storing addressing parameters for programming said first and second memory controllers for asserting said address signals in either linear or x/y format.

6. The processor of claim 5, wherein said memory comprises a plurality of registers including a base register for storing an initial memory address and a pitch register for storing a value defining an amount of memory per line associated with an external memory device.

7. The processor of claim 6, wherein said plurality of registers include an offset register for storing an address value added to said initial memory location for implementing indirect addressing.

8. The processor of claim 1, wherein said set of latches includes two inputs for coupling to the first and second buses, respectively, and two outputs for coupling to the first and second buses, respectively, for allowing bidirectional data flow between the first and second buses.

9. The processor of claim 8, further comprising:
    input select logic coupled to said control logic and having respective inputs for coupling to the data portions of the first and second buses and an output for providing selected data to said set of latches; and
    output select logic coupled to said control logic and having an input for receiving data from said set of latches and having respective outputs coupled to the data portions of the first and second data buses;
    wherein said control logic provides control signals for controlling the direction of data flow between the first and second buses.

10. The processor of claim 9, wherein said set of latches further includes first-in, first-out latches.

11. The processor of claim 10, wherein said first-in, first-out latches include a set of input first-in, first-out latches coupled to said input select logic and a set of output first-in, first-out latches coupled to said output select logic.

12. The processor of claim 1, further comprising:
    execution logic coupled to said control logic and for coupling to the data portion of the first bus for receiving and executing instructions and any associated parameters and providing data to said set of latches; and
    wherein said first memory controller asserts address signals on the first bus for retrieving instructions for execution by said execution logic, and wherein said second memory controller asserts address signals onto the second bus corresponding to data from an output of said set of latches.

13. The processor of claim 12, wherein after said first memory controller asserts address signals to retrieve a first instruction and while said execution logic is executing said first instruction and while second memory controller is asserting address signals on the second bus corresponding to data provided from said set of latches, said first memory controller asserts additional address signals on the first bus for retrieving a second instruction.

14. The processor of claim 12, wherein said execution logic further includes memory for storing said instructions and associated parameters.

15. The processor of claim 1, further comprising:
    multiplexor logic receiving address signals from both said first and second memory controller and for providing address signals on the first and second buses, said multiplexor logic further receiving select signals from said control logic for selecting between said first and second memory controllers.

16. The processor of claim 15, wherein said multiplexor logic includes:
    a first multiplexor having first and second inputs for receiving address signals from said first and second memory controller, respectively, a select input for receiving a first select signal from said control logic for selecting between said first and second memory controller and an output for providing selected address signals on the first bus.

17. The processor of claim 16, wherein said multiplexor logic further includes:
    a second multiplexor having first and second inputs for receiving address signals from said first and second memory controllers, respectively, a select input for receiving a second select signal from said control logic for selecting between said first and second memory controllers, and an output for providing selected address signals on the second bus.

18. The processor of claim 15, wherein said second memory controller provides address signals to read data from the second bus from one addressable location and wherein said first memory controller provides address signals to write data to the second bus to a second addressable location.

19. The processor of claim 18, wherein the data read from the second bus is provided to an input of said set of latches, wherein data written to said second bus is provided from an output of said set of latches and wherein said control logic asserts select signals to said multiplexor logic for selecting said first memory controller to read data and for selecting said second memory controller to write data.

20. The processor of claim 15, wherein said first and second memory controllers are both programmable for asserting said address signals in either linear or x/y format.

21. The processor of claim 20, further comprising:

memory coupled to said first and second memory controllers for storing a base address value identifying an initial memory location and a pitch value identifying an amount of memory per line associated with an external memory device.

22. The processor of claim 21, wherein said memory further stores an offset value for adding to said base address value for implementing indirect addressing.

23. The processor of claim 20, wherein said set of latches further includes input and output select logic for allowing data flow in either direction between the first and second buses.

24. The processor of claim 1, wherein said set of latches includes:

pixel alignment logic having inputs for receiving data from the data portion of the first and second buses, and an output;

input FIFOs receiving data from said output of said pixel alignment logic for synchronizing and providing data at an output;

operation logic having an input for receiving and manipulating pixel data from said input FIFOs and providing manipulated pixel data at an output; and output FIFOs receiving said manipulated pixel data from said operation logic and providing synchronized data to the data portions of the first and second buses.

25. The processor of claim 1, further comprising:

said set of latches including an input portion and an output portion, wherein said input portion includes two inputs coupled to the data portions of the first and second buses, respectively; and operation logic coupled between said input and output portions of said set of latches for combining data from the first and second buses;

wherein said first memory controller asserts address signals to retrieve data from the first bus and said second memory controller asserts address signals to retrieve data from the second bus, and then said second address controller is reprogrammed by said control logic to assert address signals to write data from said output portion of said set of latches onto the second bus.

26. The processor of claim 25, wherein said set of latches includes first-in, first-out latches for synchronizing data flow.

27. A graphics system, comprising:

a first bus having address and data portions;

a first memory coupled to said first bus;

a second bus having address and data portions;

a second memory coupled to said second bus; and a processor coupled to said first and second buses, comprising:

a first memory controller for providing address signals onto said address portion of said first bus;

a second memory controller for providing address signals onto said address portion of said second bus;

data means coupled to said data portions of said first and second buses; and control logic coupled to said first and second memory controllers and said data means.

28. The graphics system of claim 27, wherein said first memory stores graphics instructions and data.

29. The graphics system of claim 27, wherein said second memory comprises a frame buffer for storing pixel data.

30. The graphics system of claim 29, wherein said second memory comprises video random access memory.

31. The graphics system of claim 27, further comprising a third memory coupled to said second bus.

32. The graphics system of claim 31, wherein said third memory comprises a buffer for storing depth information.

33. The graphics system of claim 27, wherein said first and second memory controllers are programmable by said control logic for asserting address signals in different addressing formats.

34. The graphics system of claim 33, wherein said processor further includes:

memory coupled to said first and second memory controllers for storing address parameters for programming said first and second memory controllers to assert address signals in either linear or x/y format.

35. The graphics system of claim 34, wherein said processor memory stores a base address associated with said first memory.

36. The graphics system of claim 35, wherein said memory stores a pitch value representing an amount of data in each group of a plurality of data groups stored consecutively in said first memory, where each group is associated with a line of data of said second memory.

37. The graphics system of claim 36, wherein said pitch value is used relative to said base address.

38. The graphics system of claim 36, wherein said memory stores an offset address added to said base address for implementing indirect addressing.

39. The graphics system of claim 27, wherein said data means includes two inputs coupled to said first and second buses, respectively, and two outputs coupled to said first and second buses, respectively, for allowing bidirectional data flow between said first and second buses.

40. The graphics system of claim 39, wherein said data means further includes:

data input select logic coupled to said control logic for selecting between said two inputs of said data means; and data output select logic coupled to said control logic for selecting between said two outputs of said data means.

41. The graphics system of claim 40, wherein said processor further comprises:

address select logic coupled to said first and second memory controllers, said first and second buses and said control logic, wherein said control logic selects between said first and second memory controllers for asserting address signals on said first and second buses.

42. The graphics system of claim 41, wherein said address select logic comprises:

a first multiplexer having two inputs for receiving address signals from said first and second memory controllers, respectively, and an output for providing selected address signals on said first bus; and a second multiplexer having two inputs for receiving address signals from said first and second memory controllers, respectively, and an output for providing selected address signals on said second bus.

43. The graphics system of claim 41, wherein said second memory controller provides address signals to read data from said second bus at one address and wherein said first memory controller provides address signals to write data to said second bus at another address.

44. The graphics system of claim 41, wherein said first and second memory controllers are programmed by said control logic for asserting address signals in either linear or x/y format.

45. The graphics system of claim 44, wherein said processor further comprises:

memory coupled to said first and second memory controllers for storing address parameters to program said first and second memory controllers into linear or x/y addressing formats.

46. The graphics system of claim 45, wherein said memory stores a base address and a pitch value associated with said first memory.

47. The graphics system of claim 46, wherein said pitch value represents an amount of data per group for each of a plurality of data groups stored consecutively in said first memory equivalent to an amount of data per line in said second memory.

48. The graphics system of claim 47, wherein said line in said second memory is less than the pitch of said second memory.

49. The graphics system of claim 41, wherein said processor further comprises:

execution logic coupled to said control logic for executing instructions provided by said control logic, wherein said execution logic provides data to said data means; and wherein said address select logic selects said first memory controller for asserting address signals on said first bus for retrieving instructions for execution by said execution logic, and wherein said address select logic selects said second memory controller for asserting address signals onto said second bus for writing data to said second memory provided from said data means.

50. The graphics system of claim 49, wherein after said first memory controller asserts address signals to retrieve a first instruction and while said execution logic is executing said first instruction and said second memory controller is asserting address signals on said second bus, said first memory controller asserts address signals on said first bus to retrieve a second instruction.

51. A computer system, comprising:

a host bus having address and data portions;

a host central processing unit coupled to said host bus;

a private memory coupled to said host bus for storing graphics instructions and associated data;

a local graphics bus having address and data portions;

a frame buffer coupled to said local graphics bus; and a graphics processor coupled to said host and local graphics bus, comprising:

a first memory controller for providing address signals onto said address portion of said first bus;

a second memory controller for providing address signals onto said address portion of said second bus;

data means coupled to said data portions of said first and second buses; and control logic coupled to said first and second memory controllers and said data means.

* * * * *